Oct. 3, 1933.  F. W. CUTLER  1,928,993
WIPER MECHANISM FOR FRUIT DRIERS
Filed March 16, 1932
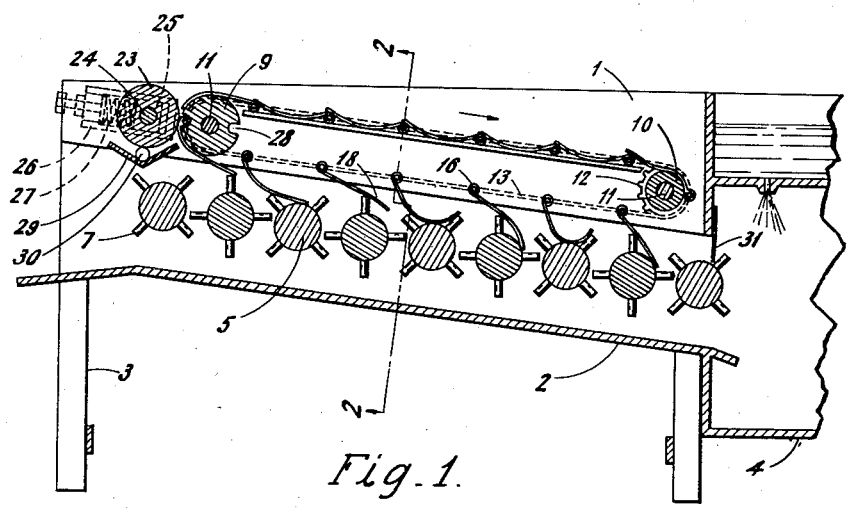
Fig. 1.
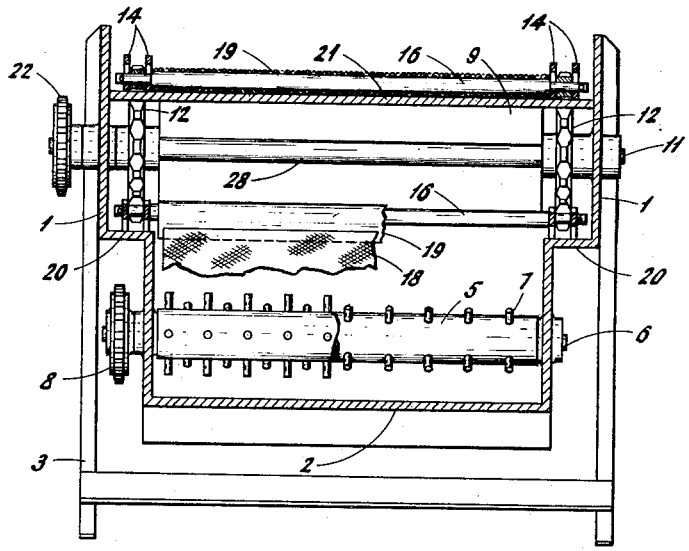
Fig. 2.
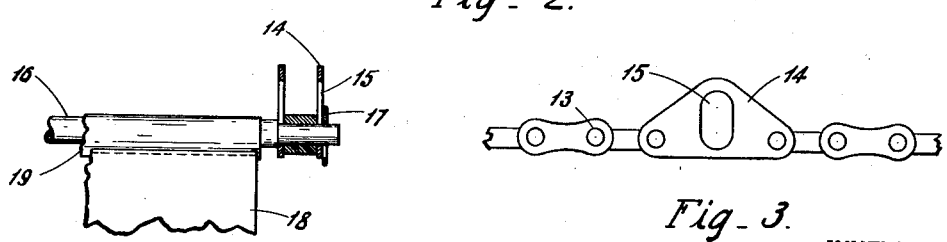
Fig. 4.
Fig. 3.
INVENTOR.
Frank. W. Cutler.
BY
Philip A. Minnis
ATTORNEY.

Patented Oct. 3, 1933

1,928,993

UNITED STATES PATENT OFFICE 1,928,993

WIPER MECHANISM FOR FRUIT DRIERS

Frank W. Cutler, Portland, Oreg., assignor to Food Machinery Corporation, San Jose, Calif., a corporation of Delaware Application March 16, 1932. Serial No. 599,205

5 Claims. (Cl. 34—1)

This invention relates to fruit drying apparatus of the character in which the fruit is passed over a conveyor and dried by the absorbing action of a series of wiping members dragged over the fruit as it is conveyed by an endless carrier mechanism to which the wipers are secured.

In apparatus of this character it is customary to provide a set of wringer rollers between which the wipers are periodically passed to express the moisture therefrom and restore their absorbent qualities, and where the wiper carrier mechanism includes a pair of endless chains running over sprockets and supporting the ends of a series of wiper carrying rods extending crosswise between the chains it is desirable to provide the wringer rollers with longitudinal grooves designed to receive the rods as they pass between the rollers, and thereby prevent separation of the rollers by the rods, which would interfere with proper wringing of the wipers.

It will be obvious that in the operation of such a device it is necessary that the carrier chains be properly timed with respect to the wringer rollers, in order that the wiper rods may register with the roller grooves, and that if the carrier mechanism happens to get out of time with the rollers the rods will no longer register with the grooves, and faulty operation of the wringer mechanism results.

It has been found that the most frequent cause of mis-timing is due to the wrinkling or folding of that portion of a wiper surrounding its cross rod, so that as the rod passes between the wringer rollers it is prevented from entering the roller groove to its proper depth. The result is that the carrier chains are forced out of mesh with the teeth of their supporting sprockets and a relative creepage between them is produced.

It is the chief object of this invention to provide against this contingency by constructing the carrier mechanism in such manner that a certain amount of relative movement is permitted between the cross rods and the carrier chains whereby slight displacements of the cross rods as they pass between the wringer rollers will not disengage the carrier chains from their sprockets.

With the above object in view, as well as others which will become more apparent hereinafter, the invention will most readily be understood by references to the accompanying drawing, in which:

Figure 1 is a longitudinal section through a fruit drier equipped with a drying mechanism embodying the features of the invention.

Figure 2 is a cross section as viewed along the line 2—2 of Figure 1.

Figure 3 is an enlarged view of a section of one of the carrier chains which support the wipers.

Figure 4 is a detail of the wiper mechanism drawn to an enlarged scale.

Referring to the drawing, the drier includes an open-ended box like structure formed by the side walls 1 and rearwardly sloping bottom 2, the whole being supported by legs 3. The fruit to be dried may be received by the drier as it comes from a washer or other treating apparatus such as indicated at 4, and which may be integral with the drier or a separate unit as desired. The fruit is conveyed through the drier by means of a conveyor comprising a plurality of transverse supporting rollers 5 arranged in parallel relation and provided with stub shafts 6 journaled in the side walls. Each of the rollers is provided with rows of spaced flexible fingers 7 for advancing the fruit, the fingers on adjacent rollers being staggered as shown, so that they pass between each other as the rollers rotate. A sprocket 8 is secured to each of the stub shafts 6 projecting from one side of the apparatus so that the rollers may be operated in a common direction, as by means of an endless chain or the like.

In the upper portion of the drier above the conveyor are located the revoluble drums 9 and 10, around which the wipers pass during operation. The drums 9 and 10 are carried by shafts 11 journaled in the side walls 1 and to these shafts adjacent the ends of the drums are secured the sprockets 12 around which pass a pair of endless chains 13 which are supported thereby. Each chain, as best shown in Figures 3 and 4, includes a series of slotted links 14 incorporated in the chain at regularly spaced intervals, the slots 15 being adapted to receive the ends of a series of rods 16 supported transversely between the chains and secured in position by cotter pins 17.

The rods 16 serve as supports for a plurality of depending absorbent wipers 18 which are wide enough to extend substantially the entire width of the conveyor over which they hang, and are long enough so that during a portion of their travel they may contact with fruit passing over the conveyor. The wipers are preferably attached to the rods by means of loosely fitting sleeves 19 made of heavy fabric such as canvas or the like, to the lower edges of which the wipers are sewed.

In order to prevent sagging of the lower run of the wiper carrying means adjacent the conveyor, the side walls 1 are offset as indicated at 20 so as to form ledges directly beneath the chains 13. A table 21 is disposed beneath the upper run of the wiper carrying means and serves to support the wipers in the upper run and prevent them from becoming entangled with the rods passing therebeneath.

The wiper carrying mechanism is driven in the direction indicated by the arrows in Figure 1 by means of a sprocket 22 secured to one of the shafts 11, and preferably are driven at a greater speed than the conveyor rollers 5 are rotated, so that the wipers are dragged over the fruit advancing over the conveyor.

Saturation of the wipers by moisture absorbed from the fruit is prevented by means of a wringer roller 23 arranged adjacent the drum 9 and coacting therewith to form a wringer through which the wipers are continually passed to express the moisture therefrom. The wringer roller 23 is provided with a shaft 24 journaled at its outer ends in squared bearing blocks 25 slidably mounted in guide ways 26 formed in the side walls 1, and suitable springs 27 are arranged to exert pressure against the bearing blocks whereby the wringer roller is maintained in yielding engagement with the drum 9.

In order that the wringer roller 23 and associated drum 9 may be maintained in coacting relationship without interference by the rods 16, the drum 9 is provided with longitudinal corrugations 28 so spaced and so arranged with relation to the teeth of the sprockets 12 adjacent the ends of the drum that each rod is received in one of them as it passes around the drum. This construction permits the wringer roller and drum to be maintained in constant contact, without interference by the rods 16, so that no portions of any of the wipers escape the wringing action.

As heretofore pointed out, it sometimes occurs during the operation of the drier that a sleeve 19 becomes wrinkled or folded, in which event the extra thickness of the sleeve, when it enters one of the grooves 28 in the drum 9, tends to prevent the carrier rod associated with that sleeve from entering the groove to its fullest depth. This condition often corrects itself automatically after a time, but as may be seen if the rods 16 were rigidly connected to the carrier chains the occurrence of the condition mentioned would tend to force the carrier chains outwardly, away from their driving sprockets, thus affording the sprockets the opportunity of creeping with respect to the chains, which would result in throwing the rods out of time with the grooves 28 whereby the rods passing between the wringer rollers would force them apart and prevent proper wringing of the attached wipers. To prevent this from occurring the slots 15 in the chain links 14 which support the rods are slightly elongated to allow a certain amount of relative movement between the chains and the rods, and by this construction creeping of the sprockets due to the occasional improper coaction between the rods and the grooves 28 is entirely avoided.

A trough 29 is arranged beneath the wringer members to receive liquid expressed from the wipers and direct it from the machine through a spout 30.

In operation, the fruit may be delivered to the drier directly from the washer 4 on the conveyor rollers which, if desired, may be simply an extension of the conveyor utilized to convey the fruit through the washer. A flexible apron 31 at the entrance to the drier prevents liquid in the washer from being splashed into the drier. As the conveyor rollers are rotated in the direction indicated, the fingers 7 advance the fruit toward the discharge end of the drier, and as the fruit is advanced the absorbent wipers 18 are dragged over the pieces of fruit at a rate somewhat faster than the rate of advance of the fruit and remove the moisture therefrom.

The wet wipers are passed between the drum 9 and wringer roller 23, whereby the liquid is expressed therefrom and their drying efficiency is restored. Since the teeth of the driving sprockets 12 are disposed in predetermined fixed relation with respect to the grooves 28 of the drum 9, the wiper carrying rods 16 are so timed as to be received in the grooves as they pass between the wringer rollers, thereby permitting the rollers to be held in contact with each other at all times so that the entire area of each wiper receives the full wringing force. By reason of the provision of the slots 15 in the rod supporting links of the carrier chains, mis-timing of the rods with the grooves 28, due to wrinkling or folding of the wiper sleeves 19, is prevented, for the reason that in the event any rod fails to enter a groove to its fullest depth the relative movement allowed between the chain and rod insures that the chain will not be lifted out of mesh with the sprocket teeth.

Although the invention has been described in connection with the drying of fruit, it will be understood that it may be used for the drying of other articles as well, and the term "fruit" as used herein is intended to be inclusive of such other articles.

Having now described my invention and in what manner the same may be used, what I claim as new and desire to protect by Letters Patent is:

1. In a fruit drier, a wiping mechanism including a pair of endless carrier members, a rod supported crosswise between said carrier members and movable relative thereto in a direction substantially normal to their plane of movement, a dependent wiping member secured to said rod, and a pair of wringer rollers between which the wiper member passes, one of said wringer rollers being provided with a corrugation for the reception of said rod.

2. In a fruit drier, a wiping mechanism including a pair of endless carrier members, each carrier member including a slotted link, a rod extending transversely between said carrier members and projecting through the slots of said slotted links, a dependent wiping member secured to said rod, and a pair of wringer rollers between which the wiping member passes, one of said wringer rollers being provided with a corrugation for the reception of said rod.

3. In a fruit drier, a wiping mechanism including movable carrier members, rigid members extending transversely between said carrier members, means attaching said rigid members to said carrier members, said means having elongated slots whereby said rigid members may have movement substantially at right angles to the plane of movement of said carrier members, with pendent wiper means attached to said rigid members, and power means for moving said carrier members.

4. In a fruit treating machine or the like including movable carrier members, rigid members extending transversely between said carrier members, pivot means connecting said rigid members to said carrier means, said pivot means comprising a connection whereby said rigid means may have lineal movement at substantially right angles to the path of travel of said carrier members, with pendent wiper members attached to said rigid members.

5. In a fruit treating machine or the like comprising an endless conveyor including transverse members spaced apart and having pendent fruit contacting members, said endless conveyor having attachment members for holding said transverse members in operative relation and allowing said transverse members to have lateral movement relative to the line of movement of said endless conveyor.

FRANK W. CUTLER.